(12) United States Patent
Hamura et al.

(10) Patent No.: US 8,277,123 B2
(45) Date of Patent: Oct. 2, 2012

(54) FLUID BEARING STRUCTURE AND METHOD OF FORMING BEARING CONCAVES IN FLUID BEARING STRUCTURE

(75) Inventors: Masayuki Hamura, Yamanashi (JP);
Kenzo Ebihara, Yamanashi (JP);
Takeshi Ooki, Yamanashi (JP)

(73) Assignee: Fanuc Ltd, Minamitsuru-Gun, Yamanashi (JP)

( * ) Notice: Subject to any disclaimer, the term of this patent is extended or adjusted under 35 U.S.C. 154(b) by 476 days.

(21) Appl. No.: 12/561,610

(22) Filed: Sep. 17, 2009

(65) Prior Publication Data

US 2010/0195943 A1 Aug. 5, 2010

(30) Foreign Application Priority Data

Feb. 4, 2009 (JP) ................................. 2009-023303

(51) Int. Cl.
*F16C 32/06* (2006.01)
*B21D 53/10* (2006.01)
(52) U.S. Cl. ........................ 384/12; 384/100; 29/898.02
(58) Field of Classification Search .................... 384/12, 384/40, 42, 100, 107, 108, 109, 114, 118; 29/898, 898.02, 898.066, 898.068
See application file for complete search history.

(56) References Cited

U.S. PATENT DOCUMENTS

| | | | | |
|---|---|---|---|---|
| 3,013,845 A | * | 12/1961 | Loch | 384/114 |
| 3,719,405 A | * | 3/1973 | Izumi et al. | 384/114 |
| 4,946,293 A | | 8/1990 | Helms | |
| 6,427,330 B1 | * | 8/2002 | Kobayashi et al. | 29/898.02 |
| 2009/0067764 A1 | | 3/2009 | Kawai et al. | |
| 2009/0304314 A1 | | 12/2009 | Derrick et al. | |

FOREIGN PATENT DOCUMENTS

| | | | |
|---|---|---|---|
| JP | 54133248 | * | 10/1979 |
| JP | 63-48809 | Y2 | 12/1988 |
| JP | 4277317 | | 10/1992 |
| JP | 4505796 | | 10/1992 |
| JP | 10-113832 | A | 5/1998 |
| JP | 2001-159426 | A | 6/2001 |
| JP | 4276277 | B2 | 3/2009 |
| WO | 2008001083 | A1 | 1/2008 |

OTHER PUBLICATIONS

Translation of JP54133248 obtained Feb. 2012.*

* cited by examiner

*Primary Examiner* — James Pilkington
(74) *Attorney, Agent, or Firm* — Lowe Hauptman Ham & Berner LLP (57) ABSTRACT

A fluid bearing structure with uniform depths of bearing concaves and a method of forming the bearing concaves in the fluid bearing structure. Pipe parts are inserted into through holes formed in the bearing base to form fluid spout holes for spouting fluid between confronting bearing surfaces. Bearing concaves are formed around the fluid spout holes. The bearing base and the pipe parts are made of different materials. A coating layer is formed on the bearing base and the pipe parts by an anodic oxidation process. Thickness of the coating layer on the bearing base is different from thickness of the coating layer on the pipe parts since the base member and the pipe members are made of different materials. The material on which a coating layer grows quickly is selected for the bearing base and the material on which a coating layer grows slowly is selected for the pipe parts.

3 Claims, 7 Drawing Sheets

# FLUID BEARING STRUCTURE AND METHOD OF FORMING BEARING CONCAVES IN FLUID BEARING STRUCTURE

RELATED APPLICATIONS

The present application is based on, and claims priority from, Japanese Application Number 2009-023303 filed Feb. 4, 2009, the disclosure of which is hereby incorporated by reference herein in its entirety.

BACKGROUND OF THE INVENTION

1. Field of the Invention

The present invention relates to a fluid bearing for supporting a part rotatably or linearly movably in a non-contact manner.

2. Description of Related Art

In an air bearing as one of static-pressure fluid bearings, pressurized air is fed into a gap of several μm between bearing surfaces from air spout holes. It is known that bearing concaves in the form of grooves or dimples having depth of several μm formed around the air spout holes improve a bearing rigidity by several times. If depths of the bearing concaves are too small, the bearing rigidity is lowered and if the depths of the bearing concaves are too large, a flow rate of the fluid is increased, tending to cause minute vibrations. Thus, the precision of depths of the bearing concaves gives great influences on performance of the air bearing, and thus high precision in forming the bearing concaves is required.

As a method of forming bearing concaves for the fluid bearing, machining for removal such as grinding and cutting have been adopted. Further, it has been adopted to form bearing concaves having predetermined widths, depths and lengths by irradiating a laser beam.

JP 10-113832A discloses a method of manufacturing a dynamic-pressure fluid bearing in which pressure is generated by flow of fluid caused by rotation of a shaft. Dynamic-pressure generating grooves are formed by moving a cutting tool having groove cutting blades at outer periphery thereof in a through hole provided in a bearing member while rotating the cutting tool relative to the bearing member. Various dynamic-pressure generating grooves are formed by varying a rotational speed of the cutting tool, a shape of the blades and the number of blades of the cutting tool.

In JP 2001-159426A, it is described to form dynamic-pressure generating grooves on at least one of bearing surfaces by cutting so as to keep a distance between the bearing surfaces of the dynamic-pressure fluid bearing and also generate a dynamic pressure. This document discloses forming coating on a bearing surface and irradiating a high energy beam such as a laser beam on the coating to form dynamic-pressure generating grooves having predetermined widths, depths and lengths.

The method of forming bearing grooves of the fluid bearing by cutting causes protrusions at outer peripheries of the formed grooves and thus it is required to remove the protrusions, so that a manufacturing cost is increased. Further, depths of the grooves are set in the order of 1 μm and it is required to form the bearing grooves with high precision in size and position, and thus it is difficult to form such bearing grooves by machining. Further, the method of forming the bearing grooves by irradiating the high energy beam such as the laser beam on the coating layer necessitates a laser machining apparatus to increase a manufacturing cost.

SUMMARY OF THE INVENTION

The present invention provides a fluid bearing structure having bearing concaves with uniform depths and a method of forming the bearing concaves on bearing surface of the fluid bearing.

A fluid bearing structure of the present invention comprises: a first member; a second member supported rotatably or linearly movably by the first member, the first member and the second member having bearing surfaces confronting each other and one of the bearing surfaces being provided with fluid spout holes and concaves around the fluid spout holes, in which at least one of the first member and the second member that has the bearing surface with the fluid spout holes is constituted by uniting a bearing base having the bearing surface and concaving parts having the fluid spout holes, the bearing base and the concaving parts being made of different kinds of aluminum alloys having difference in properties, and a coating layer formed on the bearing base and the concaving parts by an anodic oxidation process such that the concaves are formed around the fluid spout holes by a difference of thickness of the coating layer on the bearing base and the coating layer on the concaving parts.

The bearing base and the concaving parts are united such that end surfaces of the concaving parts are flush with the bearing surface of the bearing base.

A method of forming bearing concaves of the present invention is for a fluid bearing structure including a first member and a second member supported rotatably or linearly movably by the first member, the first member and the second member having bearing surfaces confronting each other and one of the bearing surfaces being provided with fluid spout holes and the bearing concaves around the fluid spout holes. The method comprises the steps of: constituting at least one of the first member and the second member by uniting a bearing base having the bearing surface and concaving parts having fluid spout holes, the bearing base and the concaving parts being made of different aluminum alloys having difference in properties; and forming a coating layer on the bearing base and the concaving parts by performing an anodic oxidation process so that the bearing concaves are formed around the fluid spout holes on the concaving parts by a difference of thickness of the coating layer on the bearing base and the coating layer on the concaving parts.

Alternatively, a method of forming bearing concaves of the present invention may comprise the steps of: constituting at least one of the first member and the second member by uniting a bearing base having the bearing surface and concaving parts, the bearing base and the concaving parts being made of different aluminum alloys having difference in properties; forming the fluid spout holes in the concaving parts; and forming a coating layer on the bearing base and the concaving parts by an anodic oxidation process so that the concaves are formed around the fluid spout holes on the concaving parts by a difference of thickness of the coating layer on the bearing base and the coating layer on the concaving parts.

BRIEF DESCRIPTION OF THE DRAWINGS

FIG. 4a is a schematic perspective view showing minute concaves formed on a concaving part made of aluminum alloy and FIG. 4b is an enlarged view of the minute concave shown in FIG. 4a;

DETAILED DESCRIPTION

Figure 1A:
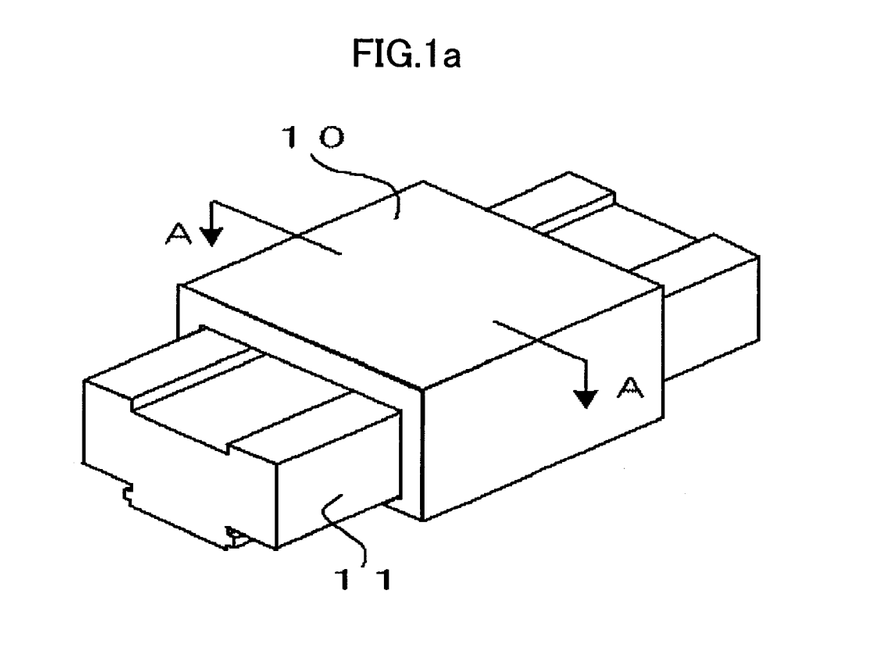
FIG. 1a and FIG. 1b are schematic perspective views of a linear slider and a rotary support device, respectively, according to the present invention.

FIG. 1a shows a linear slide as a linear fluid bearing according to the present invention. A sliding member 10 is arranged to surround a guide member 11. The sliding member 10 and the guide member 11 have fluid bearing surfaces confronting each other and the sliding member 10 is supported linearly movably by the guide member 11. Fluid spout holes are provided at one of the bearing surfaces of the slide member 10 and the guide member 11 for spouting pressurized fluid such as pressurized air so that fluid with sufficient pressure for operating the fluid bearing is supplied to the bearing surfaces. The linear slide may have an application in which the guide member 11 is fixed as a stationary member to support the sliding member 10 linearly movable, and an application in which the sliding member 10 is fixed as a stationary member for support the guide member 11 linearly movable. It is possible to provide fluid spout holes on side bearing surfaces of the guide member 11 and fluid spout holes on upper and lower bearing surfaces of the sliding member 10.

Figure 1B:
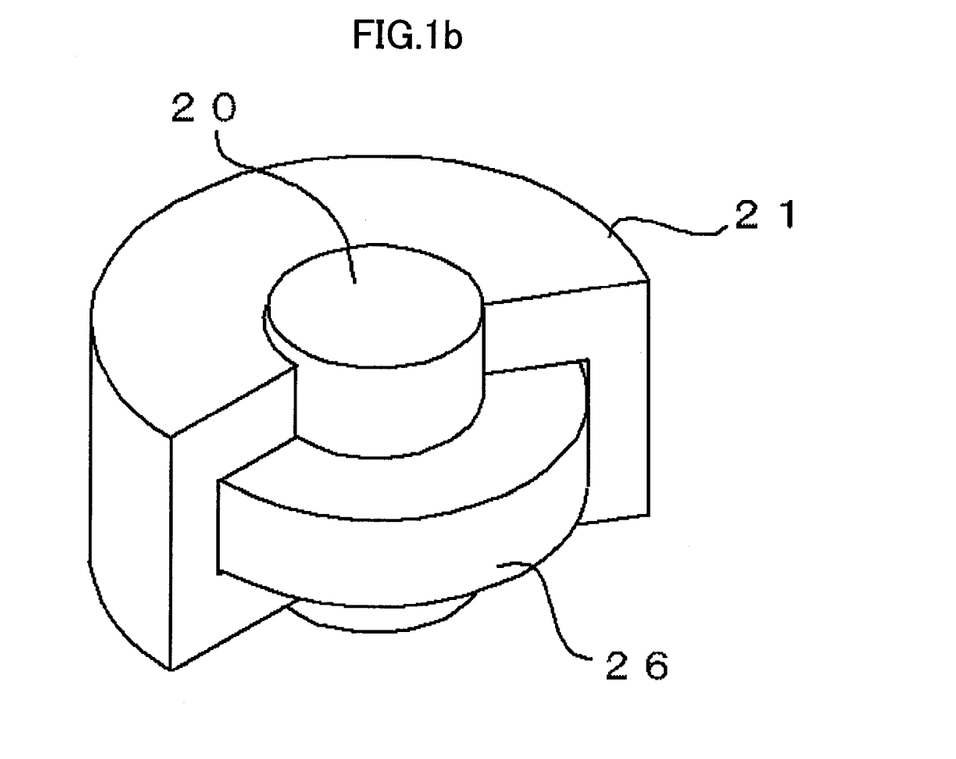

FIG. 1b shows a rotary fluid bearing according to the present invention. A rotary member 20 comprises a rotary shaft and a disk-like portion 26 with an enlarged diameter. Upper, lower and circumferential surfaces of the disk-like portion 26 of the rotary member 20, and inner surfaces of a stationary member 21 that confronts the upper, lower and circumferential surfaces of the disk-like portion 26 serve as fluid bearing surfaces so that the rotary member 20 is rotatably supported by the stationary member 21 in a non-contact manner by supplying sufficient fluid to a gap between the fluid bearing surfaces.

Figure 2A:
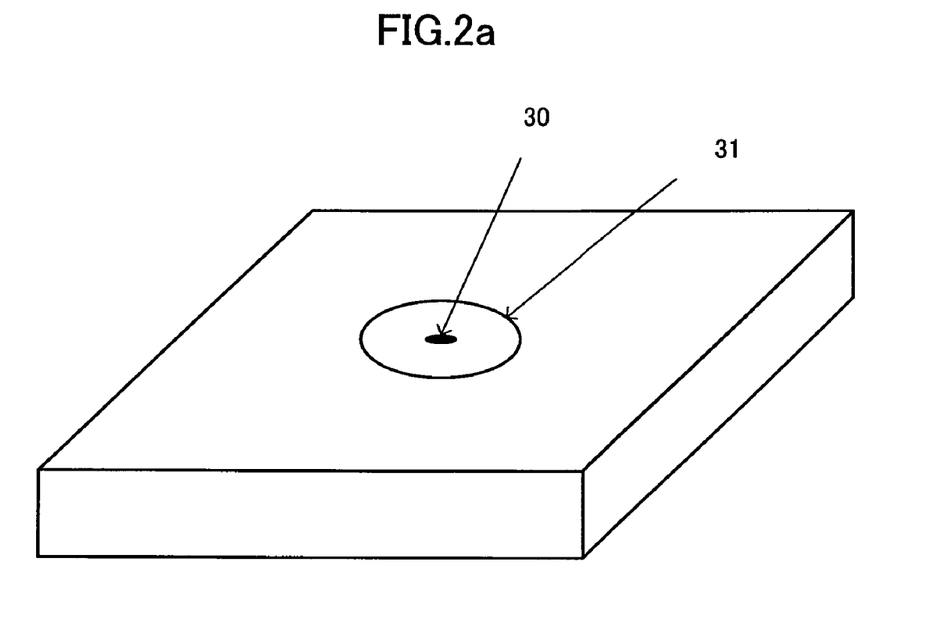
FIG. 2a and FIG. 2b are schematic views showing a fluid spout hole and a series of fluid spout holes, respectively, provided on a bearing surface of the linear slider or the rotary support device.
Figure 2B:
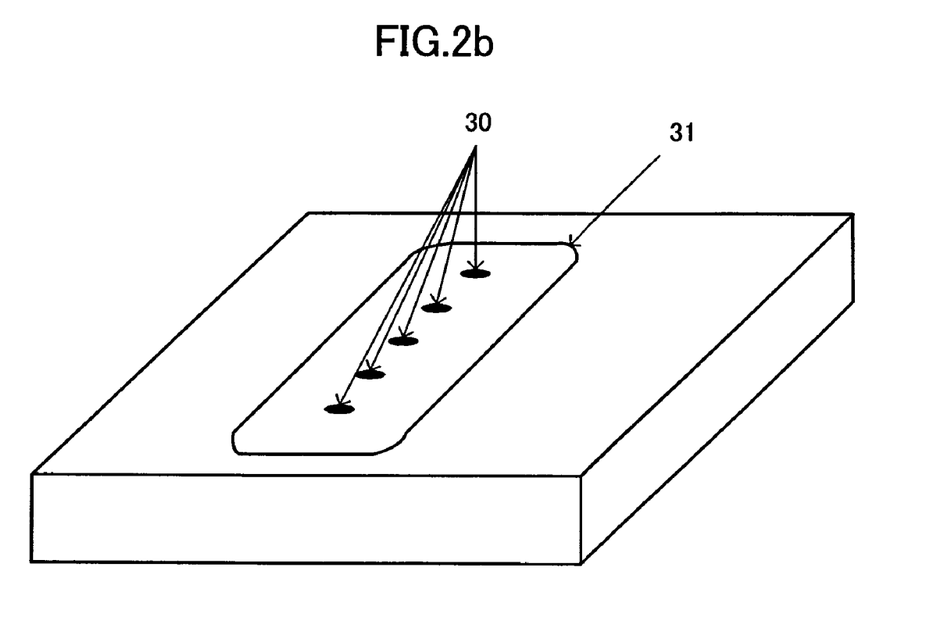

FIGS. 2a and 2b shows fluid spout holes and bearing concaves provided on the fluid bearing surface of the linear slide and the rotary fluid bearing as shown in FIGS. 1a and 1b. A bearing concave 31 may be formed around each fluid spout hole in the form of a dimple as shown in FIG. 2a, or may be formed around a plurality of fluid spout holes 30 in the form of a groove as shown in FIG. 2b. In other words, one fluid spout hole or a plurality of fluid spout holes may be formed in an area of one bearing concave 31 as shown in FIG. 2a or FIG. 2b. The fluid spout holes 30 and the bearing concaves 31 are provided on one of the confronting fluid bearing surfaces of the movable member and the stationary member. Provision of the bearing concaves 31 on the fluid bearing surfaces improves the bearing rigidity.

Figure 3:
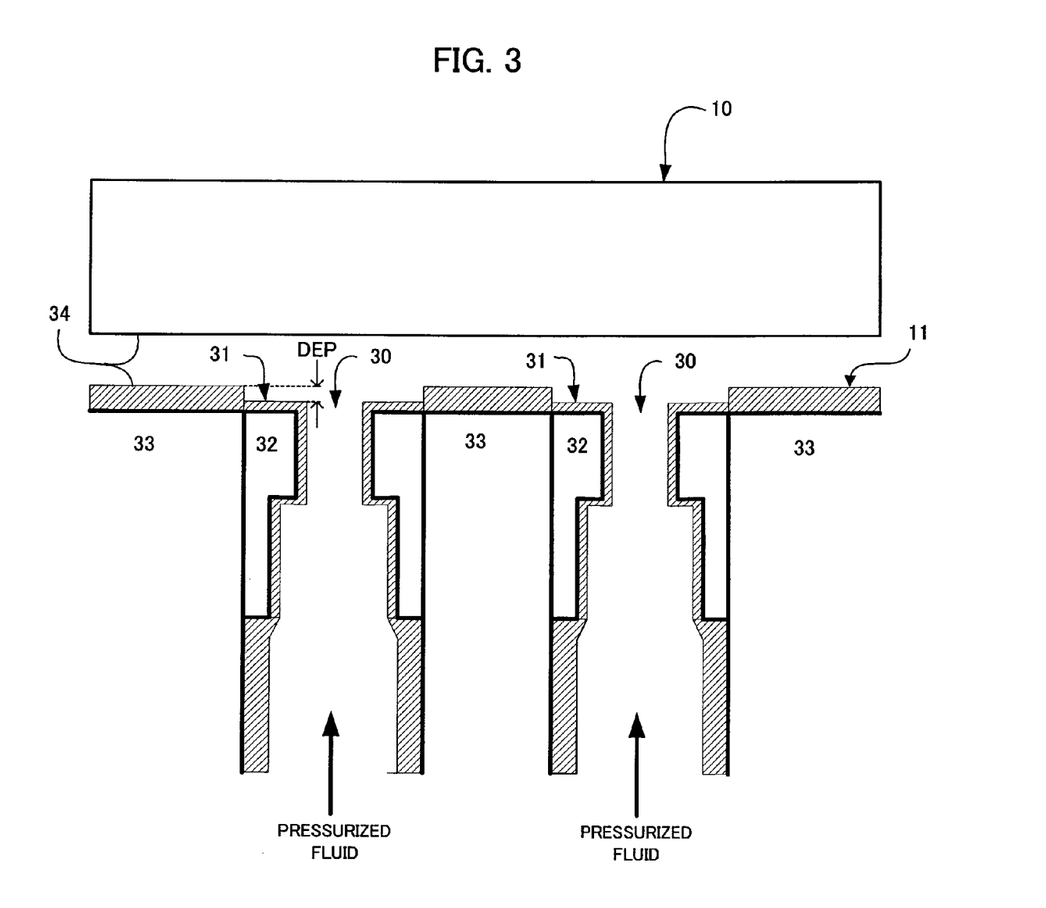
FIG. 3 is a partially-enlarged sectional view of the linear slider.

FIG. 3 shows a partial cross section of the linear slide along a line A-A in FIG. 1a. The guide member 11 comprises a bearing base 33 and pipe parts 32 as concaving parts on which concaves are formed thereon. The bearing base 33 has through holes for supplying fluid to a gap between the confronting bearing surfaces 34 of the guide member 11 and the slide member 10. The pipe parts 32 with both sides open are inserted into the through holes of the bearing base 33. An opening of the pipe member 32 on the side confronting the slide member 10 constitutes the fluid spout hole 30. The pressurized fluid spouts from the fluid spout holes 30 to the gap between the fluid bearing surfaces 34. The bearing concaves 31 are formed in the vicinity of the fluid spout holes 30. By providing the bearing concaves 31 in the vicinity of the fluid spout holes 30 so that the fluid spout holes 30 are enclosed by the respective bearing concaves 31, the bearing rigidity of the fluid bearing is enhanced.

The bearing base 33 and the pipe parts 32 are made of different materials having different properties. A coating layer is formed on the surfaces of the bearing base 33 and the pipe parts 32 by an anodic oxidation process. Since the base member 33 and the pipe members 32 are made of different materials having different properties, thickness of the coating layer on the bearing base 33 and thickness of the coating layer on the pipe members 32 formed by the anodic oxidation process are different. The material on which a coating layer grows quickly is adopted for making the bearing base 33 and the material on which a coating layer grows slowly relative to the material adopted for the bearing base 33 is adopted for making the pipe parts 32.

Figure 4A:
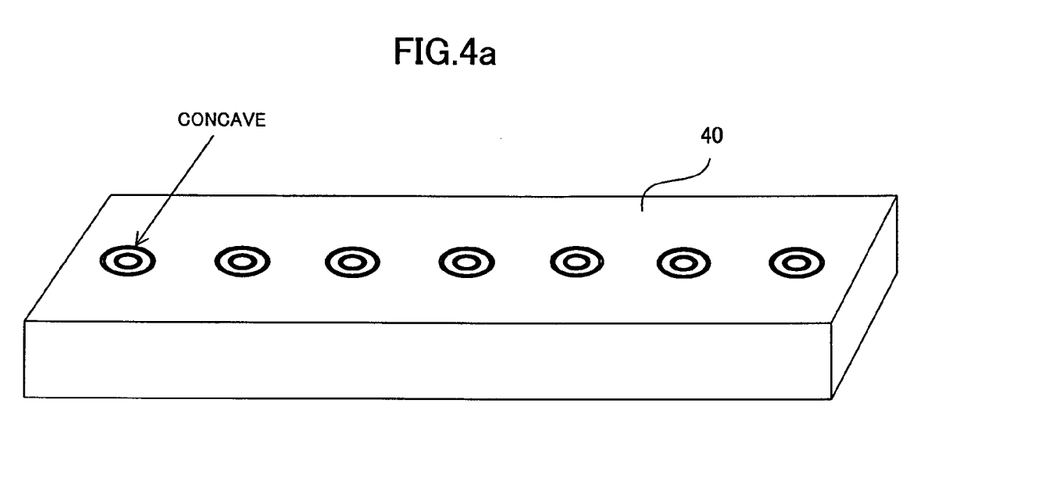
Figure 4B:
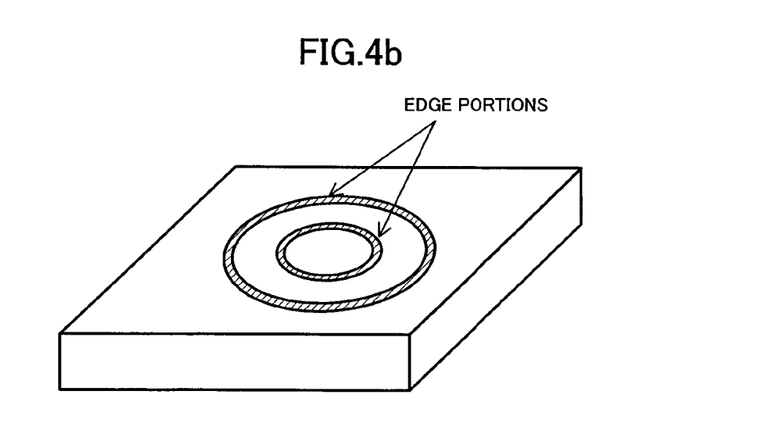

Next, it will be described to form minute concaves on a surface of an aluminum alloy parts, referring to FIGS. 4a, 4b and 5a-5d. FIGS. 4a and 4b show an example of forming of minute concaves in the form of dimples on a surface of an aluminum alloy part 40. FIG. 4a shows that minute concaves are formed on the surface of the aluminum alloy part 40 at a plurality of positions, and FIG. 4b shows an enlarged view of one of the minute concaves.

FIG. 5 a-5d show that depths of the coating layer formed on two aluminum alloys by the anodic oxidation process are different from each other due to difference in properties of the aluminum alloys. A coating layer having thickness of several $\mu m$ to several tens of $\mu m$ is formed on base materials of aluminum alloys by the anodic oxidation process. The thickness of the coating layer is varied in dependence on properties of the aluminum alloys when the anodic oxidation process is performed on the same conditions.

Figure 5A:
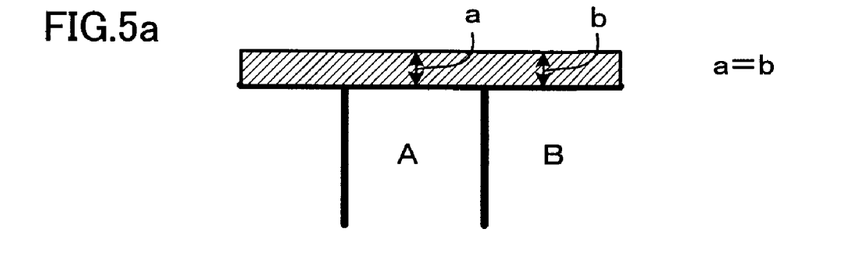
FIGS. 5a-5d are schematic cross sections of variation of coating layers formed on aluminum alloy materials by an anodic oxidation process due to properties of the aluminum alloy.
Figure 5B:
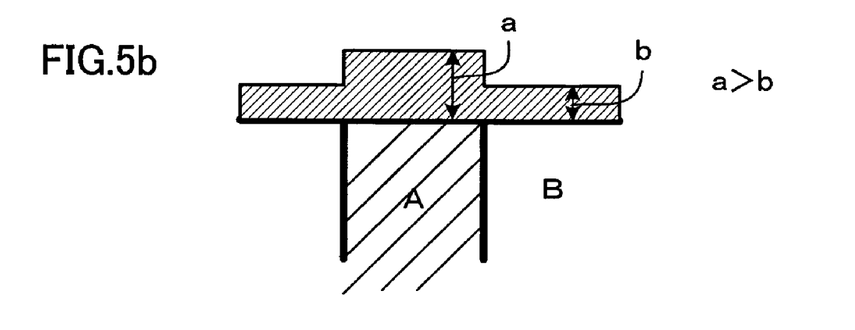
Figure 5C:
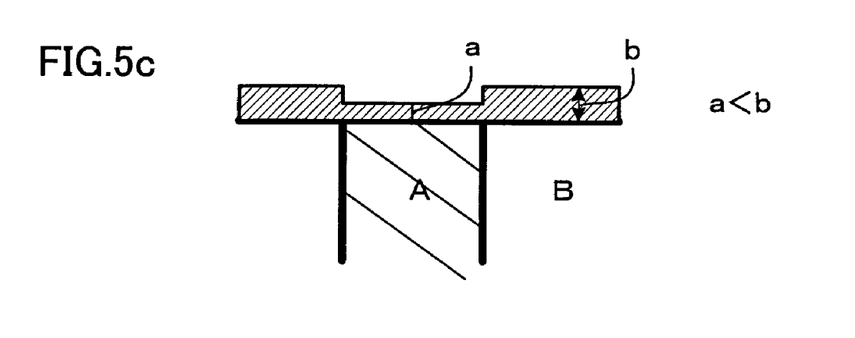
Figure 5D:
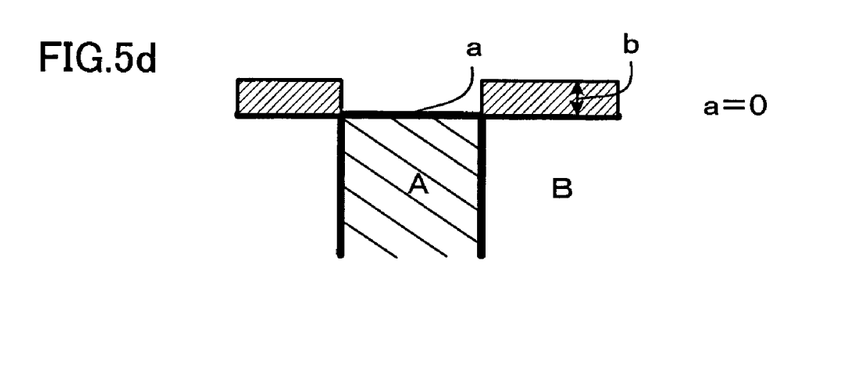

In the case shown in FIG. 5a where material A is same as material B, there is no difference between thickness "a" of a coating layer formed on the material A and thickness "b" of a coating layer formed on the material B. FIG. 5b show a case where thickness "a" of a coating layer formed on material A is greater than thickness of a coating layer formed on material B. FIG. 5c shows a case where thickness "a" of a coating layer formed on material A is smaller than thickness of a coating layer formed on material B. FIG. 5d shows a case where no layer is formed on the surface of material A. According to the present invention, different metals having properties to cause a difference between thickness of the coating layers formed on the different metals are selected so that bearing concaves are formed by the anodic oxidization process.

Figure 6A:
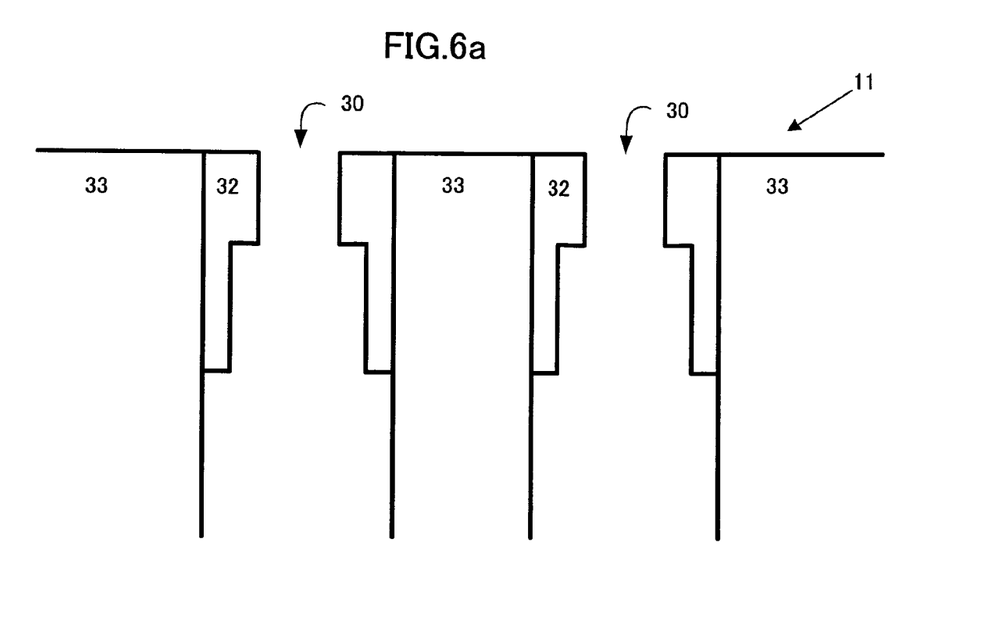
FIGS. 6a and 6b are schematic sectional views of the bearing concaves formed around the fluid spout holes by the anodic oxidation process.
Figure 6B:
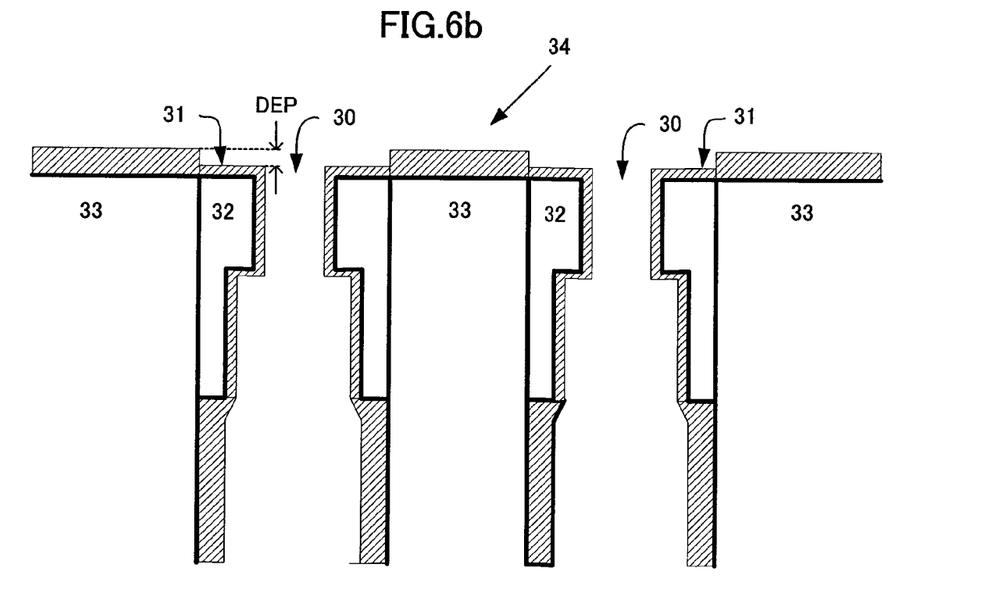

FIGS. 6a and 6b show processes of forming bearing concaves using the anodic oxidation. As shown in FIG. 6a, the guide member 11 is constituted by the bearing base 33 and the pipe parts 32 inserted into the through holes formed in the bearing base 33. The bearing base 33 and the pipe parts 32 are united by adhesion or press fit such that upper surfaces of the pipe parts and the bearing base are flush with each other.

In this embodiment, aluminum alloy A7075 is used as material of the bearing base 33 and aluminum alloy A2024 is used as material of the pipe parts 32. An anodic oxidation coating on the aluminum alloy A7075 grows more quickly than an anodic oxidation coating on the aluminum alloy A2024. Aluminum alloy A2024 is called as super duralumin and aluminum alloy A7075 is called as extra super duralumin. Aluminum alloy A2024 comprises mainly aluminum and copper, and aluminum alloy A7075 comprises mainly aluminum, zinc and magnesium.

As shown in FIG. 6b, the anodic oxidation process is performed with respect to the guide member 11 which is constituted by uniting the bearing base 33 and the pipe parts 32. Thickness of the coating layer formed on the bearing base 33 differs from thickness of the coating layer formed on the pipe parts 32 due to difference in properties of the materials of the bearing base 33 and the pipe parts 32 to form bearing concaves 31. The thickness of the anodic oxidation coating can be precisely controlled and the bearing concaves 31 having depth with required precision can be formed.

So as to obtain a predetermined depth DEP of the bearing concaves 31, experiments of the anodic oxidation process are performed with respect to a combination of different materials to form bearing concaves, and an appropriate condition of the anodic oxidation process for forming the concaves having the predetermined depth is obtained. The depth of the anodic oxidation coating is controlled based on data acquired by the experiments which indicate relation between thickness of the coating layer and a voltage applied in the anodic oxidation process, time period for immersing the materials in the chemicals, temperature of the chemicals, etc.

Figure 7:
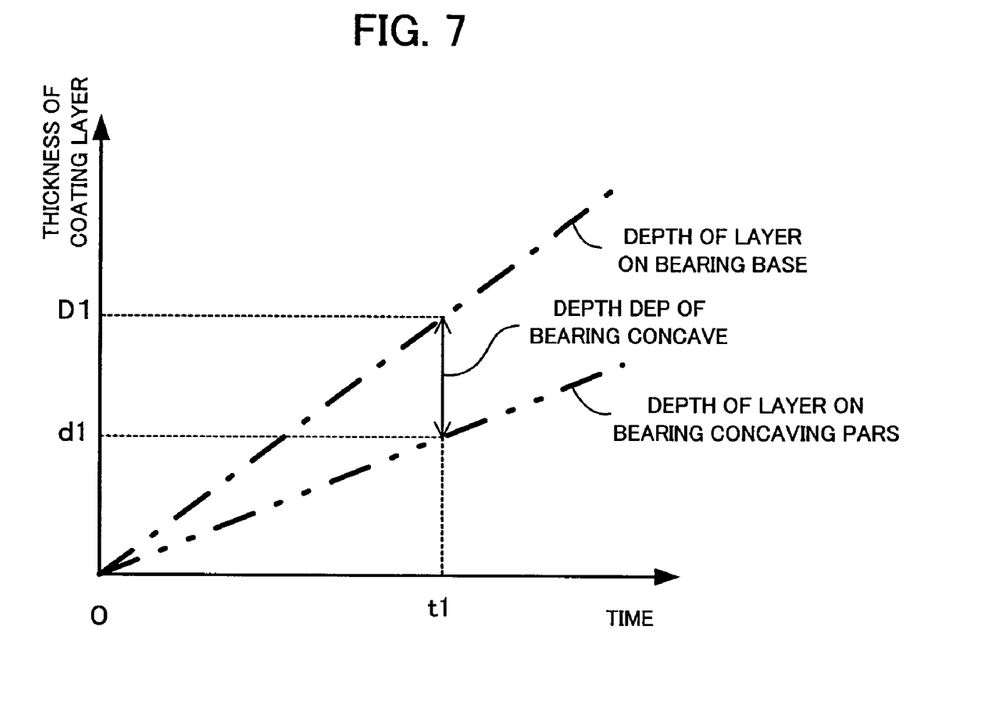
FIG. 7 is a graph showing difference of growing speeds of the coating layers due to difference in properties of the aluminum alloy.

FIG. 7 is a graph showing that a growing speed of the coating layer varies in dependence on kinds of aluminum alloys on which the coating layer grows. A relation between thickness of an anodic oxidation coating on the bearing base and lapsing time of the anodic oxidation process and a relation between an anodic oxidation coating on the concaving part and the lapsing time of the anodic oxidation process are obtained in advance. Based on thus obtained graph, the lapsing time t1 at which the depth of the bearing concave becomes the predetermined value DEP can be obtained.

In the above embodiment, the pipe parts as concaving parts on which concaves are formed thereon are inserted into the through holes formed in the bearing base to form fluid spout holes for spouting fluid between confronting bearing surfaces. Alternatively, concaving parts having no holes may be inserted into the through holes formed in the bearing base and the fluid spout holes may be formed by drilling or piercing after the bearing base and the concaving parts are united.

According to the present invention, bearing concaves with uniform depths can be formed on fluid bearing surfaces to simplify the process for forming the bearing concaves and achieve effective productions. By changing the number of fluid spout holes and diameters of the fluid spout holes in accordance with the depth of the bearing dimples and an area of the pipe members constituting the bearing surface, bearing rigidity is improved and the flow of the fluid is regulated.

What is claimed is:

1. A fluid bearing structure, comprising a first member, a second member that is rotatably or linearly movably supported by the first member, any one of the first member or the second member having fluid spout holes, and a bearing concave formed around each of the fluid spout holes, wherein
    the first member having the fluid spout holes or the second member having the fluid spout holes includes a bearing base and pipe parts,
        the bearing base having through holes, and
        the pipe parts having the fluid spout holes and inserted into the through holes of the bearing base,
    the pipe parts and the bearing base are made of aluminum alloys having different properties, and
    the bearing concaves are defined by a coating layer on the bearing base and the pipe parts, the coating layer being formed by an anodic oxidation process after inserting the pipe parts into the through holes of the bearing base.

2. The fluid bearing structure according to claim 1, wherein said bearing base and said concaving parts are united such that end surfaces of the concaving parts are flush with a bearing surface of the bearing base.

3. A method of forming bearing concaves in a fluid bearing structure comprising a first member and a second member that is rotatably or linearly movably supported by the first member, any one of the first member or the second member having fluid spout holes, and a bearing concave is formed around each of the fluid spout holes, said method comprising the steps of:
    forming the first member having the fluid spout holes or the second member having the fluid spout holes, by inserting pipe parts into through holes of a bearing base, the pipe parts and the bearing base being made of aluminum alloys having different properties,
    forming the fluid spout holes in said pipe parts, and
    forming the bearing concaves in the first member or the second member by applying an anodic oxidation process under predetermined anodic oxidation process conditions,
    or the steps of
    forming the fluid spout holes in pipe parts,
    forming the first member or the second member by inserting the pipe parts into through holes of a bearing base, the pipe parts and the bearing base being made of aluminum alloys having different properties, and
    forming the bearing concaves in the first member or the second member by applying an anodic oxidation process under predetermined anodic oxidation process conditions.

* * * * *